United States Patent Office

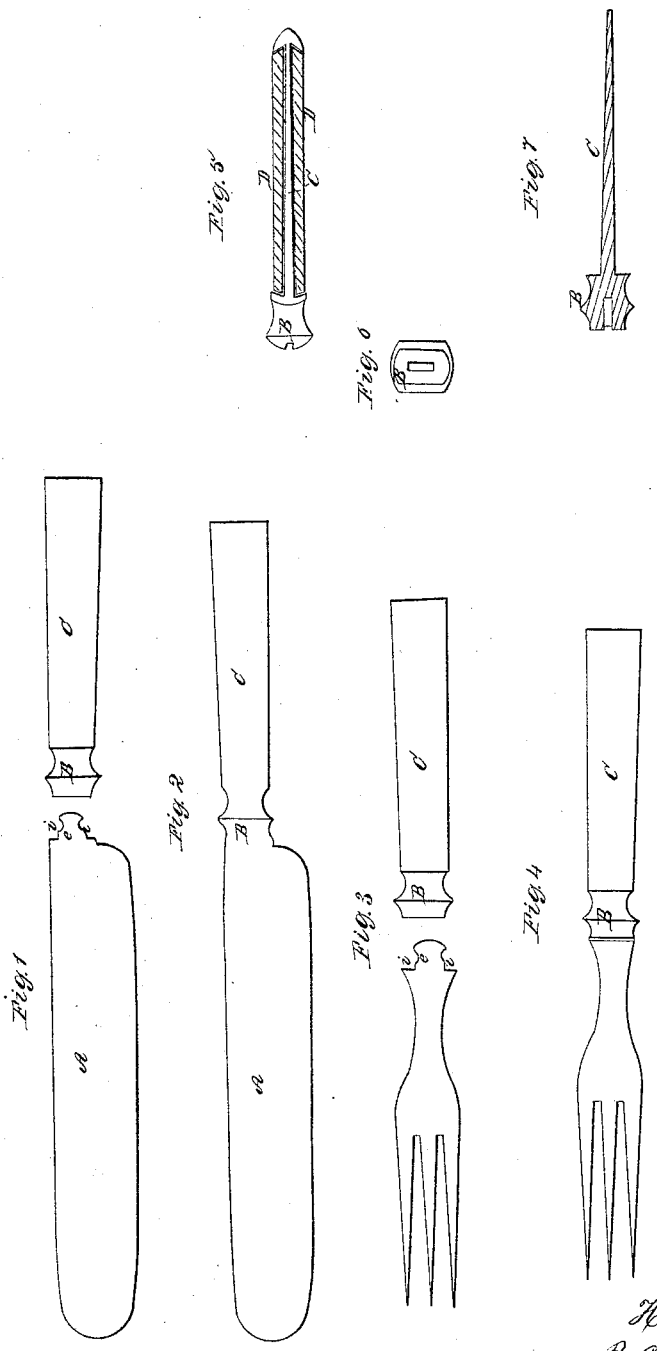
H. Sanderson,
Table Cutlery.
N° 65,123.   Patented May 28, 1867.

HENRY SANDERSON, OF SHEFFIELD, ENGLAND, ASSIGNOR TO WILLIAM SANDERSON, OF NEW YORK CITY.

Letters Patent No. 65,123, dated May 28, 1867.

---

IMPROVEMENT IN CUTLERY.

---

The Schedule referred to in these Letters Patent and making part of the same.

---

TO ALL WHOM IT MAY CONCERN:

Be it known that I, HENRY SANDERSON, of Sheffield, in the county of York, England, have invented certain new and useful Improvements in the Method of Manufacturing Knives, Forks, etc.; and I do hereby declare that the following is a full and exact description thereof, reference being had to the accompanying drawings, making part of this application.

My invention relates to a novel method of manufacturing knives and forks, and has for its main object to produce an article equal in appearance and durability to, and quite as desirable in every way as, the best knife or fork, at a much less cost of manufacture; and to this end my invention consists in making a knife, fork, or other similar instrument, by forming the blade, or that portion which is required to be very hard and durable or sharp, of steel, and with a tang at that end nearest the handle, and in uniting said tang with a bolster and shank (to which the handle is secured) by upsetting the latter around the former, as will be hereinafter more fully described.

To enable those skilled in the art to make and use my invention, I will proceed to describe it more fully, referring by letters to the accompanying drawings, forming part of this specification, in which—

Figure 1 is an elevation of a knife made in accordance with my invention.

Figure 2 is a section of the same; and

Figure 3 is a similar section, showing another modification of my invention.

In the several figures the same letter of reference indicates the same part of the instrument.

A is the blade of the knife; B, its bolster; C, the shank, to which the handle is secured; and D, the handle. The blade A is made of fine steel, of any desired pattern or shape, and is formed with a short tang or projecting portion, e. The bolster B is made of either cast iron, malleable iron, run steel, or any other suitable metal or alloy possessing the requisite qualities of strength and cheapness, and is formed with a suitable hole or cavity for the accommodation or reception of the tang e. Said bolster B is made with a proper shank, C, to which the handle D may be secured by rivets, or in any manner desired. The tang e may be made, if deemed expedient, with one or more notches, (as seen at i.) The several parts being first made separately, of about the shape shown, they are put together in the following manner, viz: The steel blade A has its tang e inserted into the cavity or receptacle formed in the bolster B. The latter is then placed between suitable dies in a press, or subjected to a blow in a trip-hammer or "drop," or to any operation of compression, whereby the stock of said bolster is swaged or upset, and made to firmly gripe and retain within itself the said tang e of the blade. In this manner the said tang e is interlocked with, and retained in, the said bolster B as securely and firmly for all practical purposes as if the tang and bolster were made all of one piece, or of two pieces welded together. The handle D may be made of any desired design, and of any suitable material, and may be secured to and around the shank C in any manner deemed best. Of course the design and material of all the parts may be varied at pleasure of the manufacturer, and form no part of my invention, the whole gist of which lies in the idea of the peculiar and economic method of making the blade and bolster portions of the knife of different metals, as described, and securely uniting such parts by adapting them to fit together, as specified, and compressing one around the other.

Previous to my invention it has been customary to unite the steel blade to the iron bolster by the operation of welding; and knives and forks have been made all of steel, in one piece, the bolster being forged into shape. It has also been customary to make the knife or fork by casting it, all in one piece, of cast or malleable iron, or of run steel; but, as will be seen, in all the modes of manufacture heretofore practised or known either the whole of the instrument had to be formed of fine steel (or of cast metal in the manufacture of a cheap and inferior article) at a considerable cost of material, or the expensive operation of welding had to come into the operation of manufacture. By my invention, it will be seen, the two separate parts are first formed as economically as heretofore, and are then very economically and firmly united simply by compression, while, at the same time, an entirety is produced in which only that portion which really need be is formed of the expensive material, (that portion which is not subjected to wear, and which does not need to be of fine material, being formed of a less costly material.)

It will be understood that my invention is applicable to the manufacture of all varieties of knives, forks, and "steels," and, in fact, to every variety of instruments in which a portion must necessarily be of fine stuff, while the shank or handle portion may be of baser metal, and the two parts require to be firmly united.

Having explained my invention so that one skilled in the art can manufacture knives, forks, etc., in accordance therewith, what I claim as new, and desire to secure by Letters Patent as an improvement in the manufacture of knives and forks, and other similar articles or instruments having the handles and blades formed of different materials or qualities of metal, is—

Uniting the handle and blade in the manner substantially as herein described.

In testimony whereof I have hereunto set my hand and seal this seventh day of February, 1867.

HENRY SANDERSON. [L. S.]

Witnesses:
  CHARLES CLEMENTS, *Solicitor, Sheffield.*
  R. P. WALKER, *Law Clerk, Sheffield.*